United States Patent Office 2,922,740
Patented Jan. 26, 1960

2,922,740
NEMATODE CONTROL

Earl P. Williams, Pen Argyl, Pa., and Raymond L. Mayhew, Phillipsburg, N.J., assignors to General Aniline & Film Corporation, New York, N.Y., a corporation of Delaware No Drawing. Application April 4, 1958
Serial No. 726,324

6 Claims. (Cl. 167—22)

This invention relates to the control and eradication of soil nematodes by means of N-alkyl-γ-hydroxycarboxylic acid amides.

It is known that in the fumigation of soils for the control or destruction of nematodes, various chemical compounds have been suggested. Many of them are heavy liquids requiring dilution with inert organic solvents and some of them are lachrymators. For example, ethylene dibromide has been employed as a soil fumigant. It is a heavy liquid with a rather low rate of evaporation, and moves slowly through the soil. Liquid mixtures of dichloropropane and dichloropropylene, which are much lighter than ethylene dibromide, have also been employed as soil fumigants, but the mixture is not nearly so toxic to soil organisms and insects.

The main disadvantage of the methods employed in soil fumigation with the foregoing organic compounds is the cost of the equipment needed to treat large seed beds and the amount of time and labor involved in moving the equipment such as, injectors, broadcasters, etc., from place to place. With most fumigants, a water seal must be applied immediately for best results. The treated area must be covered with burlap sacks, canvas and the like, which in turn must be sprinkled with water and then removed after 4 or 5 days. The soil is then allowed to aerate, and no seeds planted until every trace of the fumigant has disappeared, which usually takes from 8–12 days. In wet, cool weather, it may take longer.

Chloropicrin forms a gas that is extremely toxic to plants in both the soil and the air. Under certain weather conditions a blanket of gas may collect over a fumigated bed near the ground, then drift slowly over a nearby area, and cause severe injury to the plants growing there, especially at night when foilage is wet with dew. In addition it is a potent lachrymator.

D–D which is a mixture of 1,3-dichloropropylene and 1,2-dichloropropane, obtained as a by-product in the manufacture of allyl alcohol from petroleum is inflammable and is dangerous to use in enclosed space in the presence of sparks or open fumes.

It is an object of the present invention to provide for the control and eradication of soil nematodes with N-alkyl-γ-hydroxycarboxylic acid amides which are capable of immediate dispersion in the soil.

Other objects and advantages will become apparent from the following description.

We have discovered that N-alkyl-γ-hydroxycarboxylic aci amides are very stable compositions soluble in water, soluble in the usual selected isoparaffinic hydrocarbon fractions, straight chain liquid hydrocarbons, naphthas, deodorized kerosene, alcohols, such as ethanol, isopropanol, and the like, and are effective in a concentration of from .001 to 20% as nematocides. Effective nematode control and eradication is achieved by employing a solution or dispersion in the aforementioned concentration of at least one N-alkyl-γ-hydroxycarboxylic acid amide having the following general formula:

$$R-\underset{\underset{OH}{|}}{C}H-CH_2CH_2CONHR_1$$

wherein R represents either hydrogen or a methyl group, and $R_1$ represents at least one aliphatic hydrocarbon of from 3 to 18 carbon atoms. The aliphatic hydrocarbon may be either saturated or unsaturated and is derived from an unsaturated or saturated aliphatic primary amine.

The compounds characterized by the foregoing general formula are obtained by the reaction of 1 mole of an aliphatic N-primary amine or mixtures of such amines containing from 3 to 18 carbon atoms with 1 mole of either γ-butyrolactone or γ-valerolactone at a temperature of 80–95° C. as disclosed in application Serial No. 625,224, filed on November 30, 1956. The complete disclosure of this application is incorporated herein by reference to the various N-alkyl-γ-hydroxycarboxylic acid amides which are useful as nematocides in accordance with the present invention and to the method of preparing the same.

As illustrative examples of the nematocidal agents characterized by the foregoing formula, the following may be mentioned:

(1)   HO—$CH_2CH_2CH_2CONHCH_2CH=CH_2$

The reaction product of allylamine and γ-butyrolactone (2)   $CH_3-\underset{\underset{OH}{|}}{C}H-CH_2CH_2CONHCH_2CH=CH_2$ The reaction product of allylamine and γ-valerolactone (3)   HO—$CH_2CH_2CH_2CONH(CH_2)_3CH_3$ The reaction product of n-butylamine and γ-butyrolactone (4)   $CH_3-\underset{\underset{OH}{|}}{C}H-CH_2CH_2CONH(CH_2)_7CH_3$ The reaction product of n-octylamine and γ-valerolactone (5)   HO—$CH_2$—$CH_2$—$CH_2$—$CONHCH_2(CH_2)_8CH_3$ The reaction product of N-decylamine and
γ-butyrolactone (6)   $CH_3-\underset{\underset{OH}{|}}{C}H-CH_2-CH_2-CONHCH_2(CH_2)_8CH_3$ The reaction product of N-decylamine and γ-valerolactone (7)   HO—$CH_2$—$CH_2$—$CH_2CONHCH_2(CH_2)_{10}CH_3$ The reaction product of N-dodecylamine and
γ-butyrolactone (8)   HO—$CH_2$—$CH_2$—$CH_2CONHCH_2(CH_2)_{14}CH_3$ The reaction product of N-cetylamine and
γ-butyrolactone (9)   HO—$CH_2$—$CH_2$—$CH_2CONHCH_2(CH_2)_{16}CH_3$ The reaction product of octadecylamine and
γ-butyrolactone

(10) The reaction product of 1 mole (86.1 grams) of γ-butyrolactone with 1 mole (274 grams) of a commercially available mixture of amines having the following composition: hexadecylamine 10%, octadecylamine 10%, octadecenylamine 35%, octadecadienylamine 45%.

(11) The reaction product of 1 mole (86.1 grams) of γ-butyrolactone and 1 mole (206 grams) of a commercially available mixture of coconut amines having the following composition: octadecenylamine 5%, octadecylamine 5%, hexadecylamine 8%, tetradecylamine 18%, dodecylamine 47%, decylamine 9%, octylamine 8%.
(12) The reaction product of 1 mole (86.1 grams) of γ-butyrolactone and 1 mole (276 grams) of a commercially available mixture of amines having the following composition: hexadecylamine 6%, octadecylamine 93%, octadecenylamine 1%.
(13) The reaction product of 1 mole (86.1 grams) of γ-butyrolactone and 1 mole (213 grams) of N-tetradecylamine.
(14) The reaction product of 1 mole (86.1 grams) of γ-butyrolactone and 1 mole (162 grams) of a commercially available mixture of amines having the following composition: octylamine 3%, decylamine 90%, dodecylamine 7%.
(15) The reaction product of 1 mole (86.1 grams) of γ-butyrolactone and 1 mole (220 grams) of a commercially available mixture of amines having the following composition: octadecenylamine 2%, hexadecylamine 4%, dodecylamine 4%, tetradecylamine 90%.

As noted above, the aliphatic N-primary amine which is reacted with either the γ-butyrolactone or γ-valerolactone, may be saturated or unsaturated. As example of such amines, the following are illustrative:

Allylamine
n-Propylamine
n-Butylamine
n-Amylamine
Hexylamine
Octylamine
Nonylamine
Decylamine
Dodecylamine
Tridecylamine
Pentadecylamine
Hexadecenylamine
Octadecylamine
Oleylamine
Undecenylamine The nematocidal agents of the present invention may be employed either in solution or mixed with a solid carried such as talc, diatomaceous earth, fuller's earth, bentonite, chalk, mica, clay and the like normally employed as carriers for solid agricultural pest controls. In the preparation of a solution, the nematocidal agent is added in the aforementioned concentration, preferably in an amount ranging from 1 to 15%, in water, alcohols such as isopropanol, or any of the selected isoparaffinic liquid hydrocarbon fractions known commercially as "Soltrols," straight chain liquid hydrocarbons, naphthas, deodorized kerosene and the like. The selection of suitable liquid hydrocarbon solvents which are commercially available is very simple since they will all permeate the soil and carry the toxic concentration of the active nematocidal agents. In lieu of water or the liquid hydrocarbon solvents, the nematocidal agents may be used in aqueous emulsions, which are prepared in the customary manner, and such emulsions applied to the soil in order to drench it, particularly soils in greenhouse benches and the like. Nematocidal agents may also be injected directly into the soil. This is readily accomplished by directing the nematocidal agent into holes or other openings in the soil in an amount ranging from 10 to 400 lbs. of active ingredient per acre.

The unusual and outstanding characteristics of the nematocidal agents of the present invention, when employed as soil fumigants, are the following:

(1) Solubility in water, alcohol, and the usually employed liquid hydrocarbon solvents, thus assuring uniform concentration and deeper penetration into the soil. The nematocidal agents of the foregoing general formula where $R_1$ is a lower alkyl aliphatic group, are soluble in water to the extent of 50% or greater, whereas the higher alkyl members are soluble to less than 1%. Lower alcohols, such as ethanol, propanol, isopropanol and the like are particularly good solvents for the higher alkyl groups. Accordingly, therefore, the nematocidal agents which are less soluble in water are readily dissolved in aqueous alcohol mixtures, straight alcohols or liquid hydrocarbon solvents.

(2) Since the nematocidal agents range from liquid to waxy solids with boiling points above 250° C. they have a lower vapor pressure thus permitting soil fumigation to proceed for longer periods of time and at the same time providing for the retention of the toxic concentration for extended periods.

The following examples will illustrate the manner in which the N-alkyl-γ-hydroxycarboxylic acid amides may be employed as soil fumigants.

*Example I*

100 gram samples of dry sand were mixed with 5 gram samples of a beri of tomato roots invested with root-knot nematocides (*Meloidogyne incognita*). This mixture was transferred to clay pots and 50 mg. of the test chemical was added to the mixture. The pot was then wrapped in Saran and allowed to stand for 24 hours. The mixture was transferred to stainless steel cylindrical screens (100 mesh). The screen was placed in the bottom half of a 9 cm. Petri dish containing 25 ml. of water and covered with the Petri dish cover. An additional 10 ml. of distilled water was added to each plate in order that free water would be available in the dish. After 24 hours microscopic counts were made of the living nematodes which migrated through the screen and into the Petri dish. Nematode counts were made by microscope. At least 10 fields were read or 150 nematodes counted per dish.

| Nematocidal agent of illustration: | Total living nematodes in 10 fields |
|---|---|
| (1) | 0 |
| (2) | 0 |
| (3) | 0 |
| (4) | 0 |
| (5) | 0 |
| (6) | 1 |
| (7) | 1 |
| (8) | 0 |
| (9) | 3 |
| (10) | 1 |
| (11) | 3 |
| (12) | 2 |
| (13) | 0 |
| (14) | 1 |
| (15) | 3 |
| Blank (control) | 68 |

*Example II*

The compounds of illustrations (1) to (15) inclusive, were dissolved in water, isopropanol, and commercially available "Solstrols" to give clear solutions containing .15 gram, .40 gram, 1.2 grams and 2 grams per liter. The solvent used in the preparation of a clear solution may depend on the N-alkyl chain length as described above, and the solutions applied to sandy loam soil which was heavily infected with root-knot nematodes. The rate of application corresponded to concentrations of 150, 400, 1,200 and 2,000 parts of the nematocidal agent per million parts by weight of soil. Assuming that the top 642 inches of cultivatable soil weighed 2 million pounds per acre (43,560 sq. ft.), one would use per acre 300 lbs., 800 lbs., 2,400 lbs. and 4,000 lbs. to yield the foregoing concentrations.

About one month after treatment the soil was seeded with tomatoes. As a control, untreated plots were also planted with tomato seeds. Six weeks after seeding, the plants were lifted from the soil and the roots examined for gall formation. In the control plots, the tomato plants were stunted and their root systems covered with numerous galls. The roots of the plants grown in the soil treated with the nematocidal agents were absolutely free from galls.

*Example III*

A determination similar to that of Example II was carried out in a clay loam-type soil which was heavily infected with sugar beet nematodes. 15 separate plots of soil were treated with each of the nematocidal agents of illustrations (1) to (15), inclusive, at the rate of 2,000 parts of agent per million parts of soil by weight. About 6 weeks after treatment, the plots were seeded with sugar beets. At the same time an untreated control plot was also planted with sugar beet seeds. 12 weeks later after seeding, the plants were examined for nematode attack. In the control plot, the plants were stunted whereas the plots treated with the nematocidal agents gave normal healthy plants.

*Example IV*

In this test, the method consists of fumigating a brei of heavily infested roots of tomato plants in moist soil for 24 hours prior to suspending the test sample on No. 100 mesh stainless steel screen in adequate water.

Duplicate 100 gram samples of dry sand were mixed with 5 gram samples of a brei of tomato roots infested with root-knot nematodes, *Meloidogyne incognita*. The brei was prepared by cutting tomato roots of infested plants into quarter inch lengths, then further macerating in a Waring Blendor for one minute. The sand and the brei were mechanically mixed by shaking for one minue in a closed Mason jar. The mixture was transferred to 2¼" clay pots at which time 50 mg. of test nematocide was added to the mixture. Each pot was then wrapped in Saran and allowed to stand for 24 hours.

The mixture was then transferred to stainless steel cylindrical screens approximately 2½" high and 3½" in diameter. The screen material was 100 mesh stainless steel wire cloth. These screens were placed in the bottom half of a 9 cm. Petri dish containing 25 ml. of water and covered with the Petri dish cover. In a short time an additional 10 ml. of distilled water were added to each plate in order that free water will be available in the dish. After 24 hours, microscopic counts were made of the living nematodes which have migrated through the screen and into the Petri dish.

In the case of non-fumigant agents, nematodes may not make adequate contact with the agent until after the water is added. Therefore, these agents are read 48 hours after transferring to the screen. An effective water soluble non-fumigant agent may let nematodes pass the screen but would immobilize the nematodes in the Petri dish.

Nematode counts were made by microscope. At least 10 fields were read or 150 nematodes counted per dish. Each nematocidal agent of illustrations (1) to (15) was run in duplicate with the following results:

Nematocidal agent of illustration:

| | Total living nematodes in 10 fields |
|---|---|
| (1) | 0 |
| (2) | 0 |
| (3) | 0 |
| (4) | 0 |
| (5) | 1 |
| (6) | 0 |
| (7) | 2 |
| (8) | 0 |
| (9) | 4 |
| (10) | 0 |
| (11) | 3 |
| (12) | 3 |
| (13) | 0 |
| (14) | 1 |
| (15) | 4 |
| Blank (control) | 65 |

We claim:

1. The process of eradicating and controlling soil nematodes which comprises introducing into the nematode infested soil a nematocidal amount of at least one N-alkyl-γ-hydroxycarboxylic acid amide having the following general formula:

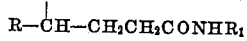

wherein R represents a member selected from the class consisting of hydrogen and methyl groups, and $R_1$ represents at least one aliphatic hydrocarbon radical of the alkyl and alkylene series containing from 3 to 18 carbon atoms.

2. The process according to claim 1 wherein the N-alkyl-γ-hydroxycarboxylic acid amide is the reaction product of 1 mole of γ-butyrolactone and 1 mole of a mixture of amines having the following composition:

| | Percent |
|---|---|
| Octadecenylamine | 5 |
| Octadecylamine | 5 |
| Hexadecylamine | 8 |
| Tetradecylamine | 18 |
| Dodecylamine | 47 |
| Decylamine | 9 |
| Octylamine | 8 |

3. A method for controlling nematode infested soil which comprises contacting said soil with a nematocidal agent having the following formula:

$$HO-CH_2CH_2CH_2CONHCH_2CH=CH_2$$

4. A method for controlling nematode infested soil which comprises contacting said soil with a nematocidal agent having the following formula:

$$HO-CH_2CH_2CH_2CONH(CH_2)_3CH_3$$

5. A method for controlling nematode infested soil which comprises contacting said soil with a nematocidal agent having the following formula:

6. A method for controlling nematode infested soil which comprises contacting said soil with a nematocidal agent having the following formula:

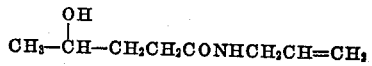

References Cited in the file of this patent

FOREIGN PATENTS 364,046   Great Britain ............ Dec. 18, 1931